(12) United States Patent
Johnsson

(10) Patent No.: US 6,321,894 B1
(45) Date of Patent: Nov. 27, 2001

(54) METHOD AND DEVICE FOR HANDLING MEANS FOR PAYMENT AND MEANS FOR PAYMENT

(76) Inventor: Yngve Johnsson, Djurgardsslatten 92, S-115 21 Stockholm (SE)

( * ) Notice: Subject to any disclaimer, the term of this patent is extended or adjusted under 35 U.S.C. 154(b) by 0 days.

(21) Appl. No.: 09/230,086

(22) PCT Filed: Jul. 21, 1997

(86) PCT No.: PCT/SE97/01304

§ 371 Date: Feb. 19, 1999

§ 102(e) Date: Feb. 19, 1999

(87) PCT Pub. No.: WO98/03942

PCT Pub. Date: Jan. 29, 1998

(30) Foreign Application Priority Data

Jul. 19, 1996 (SE) .................................................... 9602829

(51) Int. Cl.[7] ............................ G07D 11/00; G07F 19/00
(52) U.S. Cl. ........................... 194/208; 194/209; 283/57; 209/534; 705/41
(58) Field of Search ................................... 194/206–209; 283/57, 58, 66.1, 66.2, 91, 92; 705/41, 40, 45; 209/534

(56) References Cited

U.S. PATENT DOCUMENTS

| | | | | |
|---|---|---|---|---|
| 3,542,180 | * | 11/1970 | Segal ..................... | 194/209 |
| 3,587,806 | * | 6/1971 | Arita ..................... | 194/209 |
| 3,990,558 | * | 11/1976 | Ehrat ..................... | 194/206 |
| 4,025,420 | * | 5/1977 | Horino ..................... | 194/207 |
| 4,236,639 | * | 12/1980 | Boettge et al. ............. | 209/534 |
| 4,264,808 | * | 4/1981 | Owens et al. .............. | 235/379 |
| 4,402,410 | * | 9/1983 | Ohba et al. ............... | 209/534 |
| 4,536,016 | * | 8/1985 | Solomon et al. ........... | 283/111 |
| 4,681,229 | * | 7/1987 | Uesaka et al. ............. | 209/534 |
| 4,722,443 | * | 2/1988 | Maruyama et al. .......... | 209/534 |
| 4,758,714 | * | 7/1988 | Carlson et al. ............. | 235/380 |
| 4,906,827 | * | 3/1990 | Hell et al. ................ | 235/379 |
| 5,208,445 | * | 5/1993 | Nahar et al. .............. | 194/208 |
| 5,310,036 | * | 5/1994 | Hell ...................... | 194/206 |

FOREIGN PATENT DOCUMENTS

| | | | | |
|---|---|---|---|---|
| 904806 A | * | 9/1986 | (BE) . | |
| 2441343 | * | 2/1976 | (DE) ..................... | 194/208 |
| 2032547 A | * | 1/1980 | (GB) . | |
| 2038290 A | * | 7/1980 | (GB) ..................... | 209/534 |

OTHER PUBLICATIONS

"Toshiba Currency Note Arranger" by Takehana et al., Toshiba Review No. 130, pp. 21–24, Nov. 1980.*

* cited by examiner

*Primary Examiner*—Donald P. Walsh
*Assistant Examiner*—Thuy V. Tran
(74) *Attorney, Agent, or Firm*—Young & Thompson

(57) ABSTRACT

In a novel financial transaction system, a consumer exchanges payment means for goods or services provided by a retailer. The retailer then feeds the payment means, which may be in the form of bills or coinage, into a device which reads the value of the payment means. The value is transmitted to a financial institution for crediting to the account of the retailer. The retailer then destroys the payment means. The monetary value may be sent to the financial institution by electronic transmission, or may be written to a smart card. For security purposes, the information may be encrypted to require at least one code to allow writing and/or reading.

28 Claims, 1 Drawing Sheet

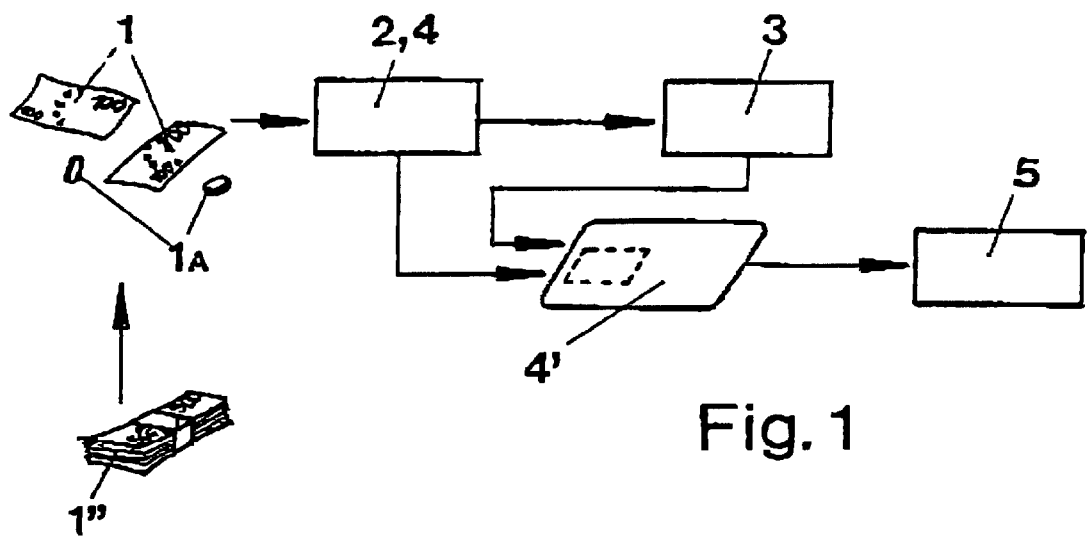
Fig. 1
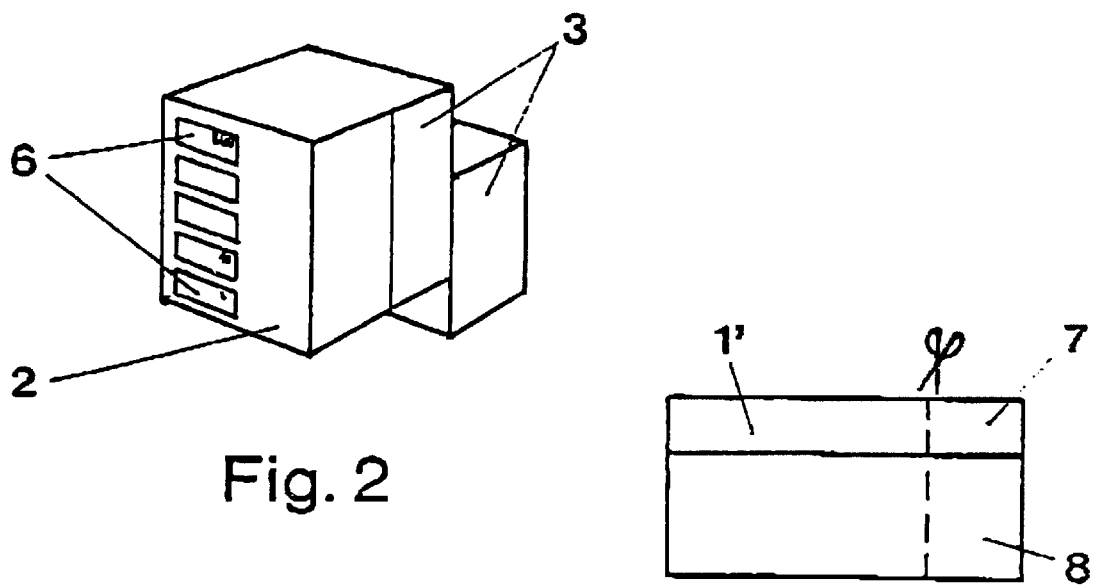
Fig. 2
Fig. 3
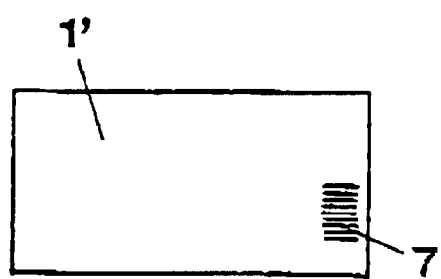
Fig. 4

METHOD AND DEVICE FOR HANDLING MEANS FOR PAYMENT AND MEANS FOR PAYMENT

The present invention relates to a method for handling payment means comprising receipt of payment means and registering payment means value in a bank or the corresponding. The invention also refers to a device for payment means handling and payment means.

In department stores, shops, transport facilities, bank officies and the corresponding bills and coins are received in large amounts as payment. In order for the recipient to gain the monetary value of the payment means in a bank office or the corresponding these must be transported to the bank or the corresponding. The problem is in principle the same for taxis, shops, like 7 Eleven, hot dog stands etc.

Value transports constitute today a very big problem and are associated with extremely high costs. Value transport companies must pay large damages both for thefts performed by the employees of the companies and for the mistakes of the personel and for traffic, vehicle and responsability insurances. An American company shows annual costs of this kind in the order of 18 million dollars. Another problem is society costs due to the need of police supervision, physical and psycichal damages at robberies, which often are armed, and personal tragedies and sufferings.

The present invention constitutes a solution to the above described problems.

Below the invention is described in more detail in association with examples of embodiment of a device according to the invention and the accompanying drawing, where FIG. 1 schematically shows a principle example over a first embodiment of a device according to the invention, FIG. 2 schematically shows a first embodiment of a device for deciding the money value of bills and for destroying the bills, FIG. 3 schematically shows one embodiment of a payment means in bill form according to the invention and FIG. 4 schematically shows a further embodiment of a payment means in bill form according to the invention.

In FIG. 1 the numeral 1 designates payment means, in the following called bills, which are in circulation and which are received as payment in e.g. a department store or the corresponding business, which dayly receives a lot of bills. The numeral 2 designates devices for receiving bills 1 and to decide and in a suitable form register the origin and money value of the bills and the numeral 3 designates destruction devices for destroying the bills after that their money value has been decided. The devices 2 can of course also be arranged for receiving coins 1A, which, however, preferably are not intended to be destroyed.

Further, according to the shown embodiment, devices 4 are provided for transmitting the money value of the payment means to a write- and readable value carrier 4', whereby said value carrier is intended to be read by a read unit placed in e.g. a bank 5 or the corresponding, whereby the value carried by the value carrier, can be gained by the proprietor.

The devices for performing the method described can be designed in a number of ways, which is described in more detail below.

In the embodiment shown in FIG. 2 the devices 2, 3, 4 comprises feed-in openings 6 for different bill denominations, whereby the bills are ordered before they are fed to the devices. The valuation devices 2 comprises devices for origin control and counting the bills 1 and a registering unit, such as a memory unit, for documentation of the accumulated value of supplied bills before they are destroyed by means of the destruction devices. Complements may be provided for receipt and valuation of coins.

Documentation and transmission of the accumulated value of the payment means to a bank or the corresponding may also be performed in different ways. According to a preferred embodiment is the registered value intended to be transmitted to a value carrier of the type smart card, i e a value carrier, which is write- and readable in electric/electronic way. It is preferred that the transmission is blocked in such a way that transmission of the value to the value carrier is not executed until at least one code is supplied by the proprietor of the value carrier. The value carrier is intended to be transported to a bank or the corresponding realisation establishment for realisation of the carried value, whereby it can be transformed into bills, be entered into a desired account etc. according to the preference of the proprietor. The value carrier is hereby arranged to be read by means of devices meant for this and hereby released from the carried value. Also the reading is preferable blocked in such a way that the reading is not possible until at least one code has been supplied to the reading devices. It is preferred that two codes should be supplied, one by the proprietor and one by the realisation establishment. Embodiments can also be imagined where a code is supplied only by the realisation establishment but where reading can be performed only be means of a so-called IR-key, the IR-key being adapted to the value carrier by means of a code carried by the value carrier.

Further blocks can also be imagined to be provided. The transmission to the value carrier, e.g. can be blocked in such a way that both registering of bill value and destruction and eventual further controls such as silver thread control, should be detected in order for transmission to occur.

It is preferred that a receipt is provided by the realisation establishment and, in applicable cases, continuous account extracts.

More simple procedures than the one described above can also be imagined. Thus, the devices 4 may comprise devices for printing of receipts, which may be supplied to a bank or the corresponding. Further, the devices 4 may be arranged so that the value is transmitted electrically/electronically in a known way via e.g. telecommunication to the realisation establishment.

A reception unit 2, 3, 4 may be a central unit for e.g. a department store and hereby be supplied with bills for valuation etc. supplied att several different reception sites, such as cashiers. Reception units for bills may also be provided in a decentralized system, such as one at each cashier or the corresponding, not shown, whereby information concerning value suitably is supplied to a central registering unit or the corresponding for documentation of accumulated bill value and external communication.

Within the scope of the invention are different methods and devices for destruction of payment means, especially bills, and different designs for payment means, especially bills. Within the scope of the invention are also an adaption of payment means material to the method of destruction and vice versa.

The following constitutes four preferred embodiments of destruction (degradation) method/payment means:

A. Thermal destruction of present material by means of e.g. micro wave heating

B. Photochemical destruction of present material by means of e.g. UV radiation

C. Thermal destruction of polymeric material of the type OPP (oriented polypropene) (such as according to UCB Films/Reserve Bank of Australia)

D. Photochemical destruction of polymeric material of the type OPP by means of UV radiation.

In all cases there exists a possibility of quantifying both denomination and number, eventually by means of second order non-linear optics.

A. By present material is here meant primarily bill paper. The destruction mechanism is in this case based upon an elevated temperature, whereby the destruction devices 3 are arranged to provide an elevation of the temperature corresponding to burning of the material. According to preferred embodiments is an elevated temperature intended to be provided by heating by means of micro waves in a substantialy known way, whereby the destruction devices 3 comprises at least one micro wave cavity and substantially known devices for generating micro waves of necessary energy. Also other arrangements, e.g. electrical and/or for IR radiation can be imagined for providing the temperature necessary for destruction.

B. By present material is also in this case meant primarily bill papaer. The destruction mechanism is in this case based upon radiation by means of ultraviolet light, UV light, whereby the destruction devices 3 comprises substantially known devices for providing UV light.

C. According to preferred embodiments the payment means, the bills, are substantially made of a polymeric material, which is comparatively easy-to-destruct by elevated temperature e.g. oriented polypropene, OPP, or a similar material.

Thermal destruction takes place by elevation of the temperature to a level such that extensive chain rupture takes place in the material. The destruction devices 3 comprise in this case, not shown, devices for the provision of an elevated temperature and may be used upon heating by means of e.g. electricity, micro waves, IR readiation etc. in a substantially known way. In order to heat OPP by micro waves the material comprises maleine acid anhydride.

D. Thus, according to the last mentioned preferred embodiments the bills are substantially made of polymeric material and intended and arranged to be destructed by radiation by means of UV light of sufficient energy to generate chain rupture in the material. One example of suitable material is OPP or a similar material. The destruction devices 3 comprises hereby, not shown, devices for generating the UV light necessary.

Thus, according to preferred embodiments the payment means are substantially made of polymeric material, one or more, and a great number of destruction or degradation mechanisms are hereby possible in order to provide property changes to such an extent that non-usability as payment means shall be considered to have been obtained. According to the invention these mechanisms can be used one at a time or in combination with one or more of the other mechanisms. The following constitutes basic destruction- or degradation mechanism for polymeric materials, where all mechanisms of influence may destroy the physical properties of the polymeric material by change of colour, change of shape, embrittlement etc.:

thermal influcence
influence by light
atmospheric influence
hydrolysis
bio influence Especially preferred as polymeric bill material are materials from the group polyolefines, in particular polypropene, polyethene and metallocenes among others.

Polypropene is preferred in the form OPP, oriented polypropene, and a particularly preferred embodiment is a bill material developed for Australian dollars by British UCB Films in cooperation with Reserve Bank of Australie, as described in Plastforurri No. 3, 1997. As an UV light source for both the curing of printing colour and the photochemical destruction of polymeric bill material high intensive UV lamps developed by Fusion UV Systems, USA, are preferred in many cases.

This material offers important advantages in the form of about 4 times longer life compared to present bills and recirculability of the material. A general advantage associated with oriented polymeric materials for bills is that shrinking occurs at a certain elevated temperature, which shrinkage in practice constitutes a destruction.

Another imagineable material for bills is a polyethene material developed by Polyart, Sweden.

In FIG. 3 the numeral 1' designates a bill, a payment means in bill form, which comprises an automatically readable information carrier 7, where said information comprises, among other things, the denomination of the bill. The information carrier may be of a magnetic, known kind or another suitable known kind. According to one embodiment the bill comprises a post (after) control part 8 intended to be disconnected from the rest of the bill for post control. In the embodiment shown in FIG. 4 the information carrier comprises an automatically readable code in the form of so-called bar code.

The method according to the invention as well as the function of the device and th payment means according to the invention should to a substantial part have been disclosed above.

The monetary value of payment means received as payment in a department store or the like is decided whereafter at least bills are destroyed. Said value is documented and the value is transmitted to a bank or the corresponding for the gain of the recipient of the payment means. Destroyed bills are replaced, when applicable and desired, by means of new printed bills 1", as indicated in FIG. 1.

As should be obvious from the description above, the need for external and with the above described problems associated value transports are eliminated substantially totally by means of the invention.

Above the invention has been described in association with examples of embodiments.

Of course further embodiments and minor changes and complements can be imagined without leaving the basic inventive idea.

The invention comprises two important parts apart from the transmission of registered value, namely the identification of denomination, number and origin and destruction.

Apart from methods and devices for identification of present bills known today, among other things by means of new development of bills as far as material is concerned, new identification methods and dito devices may be imagined for decision regarding origin and/or denomination. Some imaginable mechanisms are the following:

chemiluminiscence, whereby the bill material comprises one or more substances, which, as a result of generated chemical energy, generates light, which can be detected and wave-lenght measured for identification purposes, photochromism, whereby the bill material comprises one or more substances, which change colour when lit upon, where the change of colour can be detected for identification purposes, piezochromism, whereby the bill material comprises one or more materials, which change colour when put under pressure, where the change of colour can be detected for identification purposes, thermochromism, whereby the bill material comprises one or more substances, which change colour with temperature, where the change of colour can be detected for identification purposes, and depolymerization of polymers used within photoresist technology.

The above identified mechanisms relate substantially to polymeric materials.

Thus, the devices for decision regarding the money value of received bills can be designed in several ways depending on, among other things, the desired degree of automation. Thus, the devices may comprise bill counters of the kind used today by banks etc.

Further development of bills can also be imagined, where one approaches disposable bills, i.e. bills of a more simple and cheaper kind than the bills of today, without, however, deleting the possibilities of origin control.

Payment means shall here be given a broad interpretation and may, apart from bills and coins, be other kinds of documents of value, such as lottery, coupons etc. which according to the invention wholly or partly are destructed at a suitable stage of the handling process, whereby payment may be motivated by collection or the corresponding.

The method and the device according to the invention can be supplemented by different kinds of control arrangements. Thus, destroyed bills may by means of suitable devices be accurately weighed, not shown, for comparison with the money value decided upon.

As far as destruction is concerned purely mechanical devices, e.g. of the kind document destroyer, may be imagined.

Thus, the invention shall not be considered restricted to the embodiments and variations discussed above, but may be varied within the scope of the accompanying claims.

What is claimed is:

1. A method for accomplishing payment comprising the steps of:
    receipt of payment means by a provider of goods or services;
    registration of a monetary value of the payment means;
    destruction of all of the payment means received and registered; and
    transmission of only data representing said monetary value of the received, registered, and destroyed payment means to a financial institution.

2. The method of claim 1, comprising the further step of printing new payment means having a monetary value corresponding to the monetary value of the destroyed payment means.

3. The method of claim 1, wherein said transmission and registration are performed electronically.

4. The method of claim 1, wherein the transmission step includes writing the monetary value of the payment means to a smart card.

5. The method of claim 4, wherein the transmission step further comprises transferring the smart card to the financial institution for credit of the monetary value of the amount written to the smart card.

6. The method of claim 4, wherein said steps of writing to the smart card and reading of the smart card require the provision of at least one code.

7. The method of claim 1, wherein the destruction step includes thermic destruction of the payment means by UV radiation.

8. The method of claim 1, wherein the destruction step includes photochemical destruction of the payment means by UV radiation.

9. The method of claim 1, wherein the destruction step includes destroying the payment means by UV radiation provided by a high intensity UV light.

10. The method of claim 1, wherein the payment means substantially comprises polymeric material, and wherein the destruction step comprises at least one of thermal influence, influence by light, atmospheric influence, hydrolysis, and bio influence.

11. The method of claim 1, wherein the registration step comprises identification of the payment means by at least one of chemiluminescence, photochromism, piezochromism, thermochromism, and depolymerization of polymers used in photoresist technology.

12. The method of claim 1, wherein the registration step and the destruction step are performed centrally by the provider of goods or services.

13. The method of claim 1, wherein the registration step and the destruction step are performed at plural locations by the provider of goods or services.

14. The method of claim 13, wherein the registration and destruction steps are performed at a plurality of cashier locations.

15. A device for use in a financial transaction with a provider of goods or services including the transfer of payment means, comprising:
    a payment means reader capable of receiving a payment means and identifying and recording a monetary value of the payment means;
    a payment means destruction device adapted to receive said payment means from the payment means reader and destroy all said payment means received and identified; and
    a transmission mechanism adapted to store the monetary value of the payment means destroyed by the destruction device so that the monetary value can be read by a financial institution and credited to the provider of goods or services.

16. The device of claim 15, wherein the transmission mechanism is adapted to electronically store the value of the destroyed payment means.

17. The device of claim 15, wherein the transmission mechanism is adapted to electronically store the value of the destroyed payment means to a smart card.

18. The device of claim 17, wherein the smart card is adapted to be read by the financial institution.

19. The device of claim 17, wherein the smart card is adapted so that information regarding the monetary value can be written to and read from the smart card only if at least one code is provided.

20. The device of claim 15, wherein the destruction device is adapted to destroy the payment means thermally by UV radiation.

21. The device of claim 15, wherein the destruction device is adapted to destroy the payment means by exposing the payment means to high intensity UV light.

22. The device of claim 15, wherein the destruction device is adapted to destroy the payment means by exposing the payment means to microwaves.

23. The device of claim 15, wherein the destruction device is adapted to destroy the payment means by exposing the payment means to at least one of thermal influence, light influence, atmospheric influence, hydrolysis, and bio influence.

24. A system for accomplishing financial transactions between a consumer and a provider of goods or services, wherein the consumer provides payment means to the provider in exchange for goods or services, the provider inserts the payment means into a payment means reader which identifies a monetary value of the payment means, the payment means reader transfers the payment to a destruction device which destroys the payment means, and the monetary value of the payment means is transmitted to a financial institution to be credited to an account of the provider.

25. The system of claim 24, wherein the transmission to the financial institution is accomplished electronically.

26. The system of claim 24, wherein the value of the payment means is written to a smart card, which is then provided to the financial institution.

27. The system of claim 24, wherein the provider has only one said payment means reader and said destruction device within a building.

28. The system of claim 24, wherein the provider has one said payment means reader and said destruction device at each cashier location.

* * * * *